United States Patent [19]
Hoffman

[11] Patent Number: 4,550,706
[45] Date of Patent: Nov. 5, 1985

[54] FUEL VAPORIZER
[75] Inventor: Paul H. Hoffman, Hialeah, Fla.
[73] Assignee: Hoffman-Lewis, Ltd., Coral Gables, Fla.
[21] Appl. No.: 683,468
[22] Filed: Dec. 19, 1984

Related U.S. Application Data
[63] Continuation of Ser. No. 534,410, Sep. 21, 1983, abandoned.

[51] Int. Cl.[4] ............................................. F02M 31/00
[52] U.S. Cl. .................................... 123/549; 123/523; 123/557; 261/DIG. 83
[58] Field of Search ............... 123/549, 557, 575, 576, 123/525, 523, 179 H, 179 G; 261/DIG. 83, 144, 145

[56] References Cited
U.S. PATENT DOCUMENTS

| | | | |
|---|---|---|---|
| 1,347,043 | 7/1920 | Justice | 123/556 |
| 1,350,821 | 8/1920 | Lamont | 123/557 |
| 1,361,503 | 12/1920 | Smith | 123/557 |
| 1,623,074 | 4/1927 | Tartrais | 123/557 |
| 2,285,905 | 6/1942 | Cunningham | 123/523 |
| 2,315,881 | 4/1943 | Thomas | 123/525 |
| 2,339,988 | 1/1944 | Gerson | 123/525 |
| 3,227,427 | 1/1966 | Wells | 261/DIG. 83 |
| 4,106,457 | 8/1978 | Totten | 123/557 |
| 4,342,303 | 8/1982 | McCord | 123/557 |
| 4,356,805 | 11/1982 | Kler | 123/557 |

*Primary Examiner*—Ronald H. Lazarus
*Attorney, Agent, or Firm*—Dennis H. Lambert

[57] ABSTRACT

A fuel vaporizer for an internal combustion engine comprises an air/fuel heating and mixing chamber which vaporizes liquid hydrocarbon fuel to a heated, dry vaporous state and mixes it with heated air for introduction of the mixture into a primary or main air stream for supply to the cylinders of the engine. A first form of the vaporizer uses exhaust gas from the engine to heat the fuel and air, and a second form of the invention uses electrical resistance elements to heat the fuel and air. Both forms of the invention include supplemental vaporized fuel supply devices operable during acceleration and starting.

11 Claims, 10 Drawing Figures

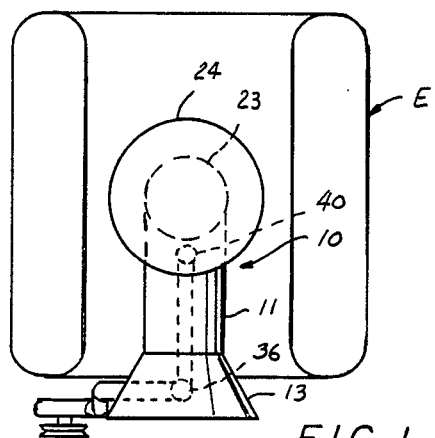
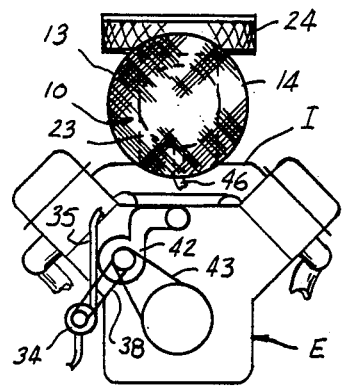
FIG 1    FIG 2
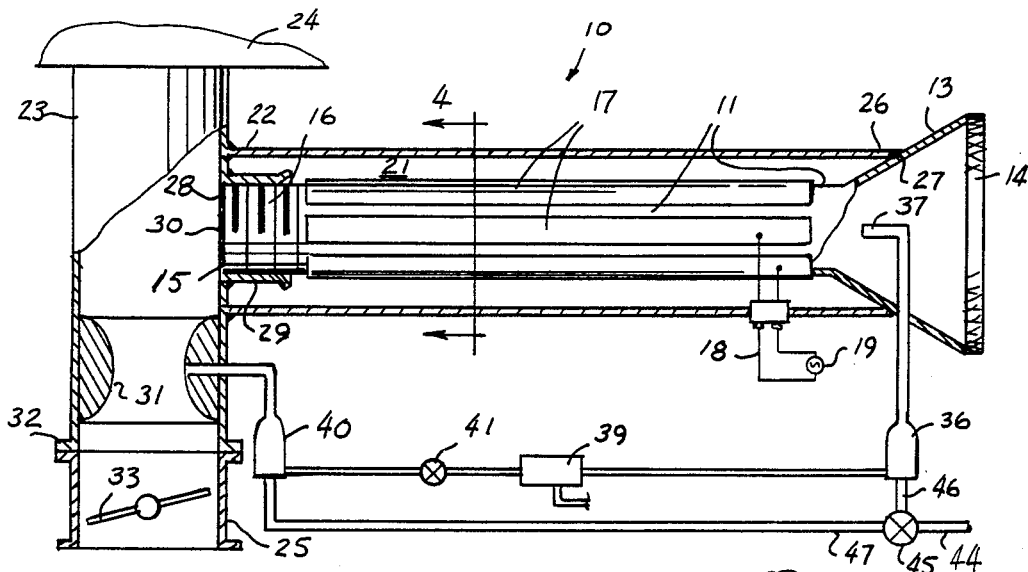
FIG 3
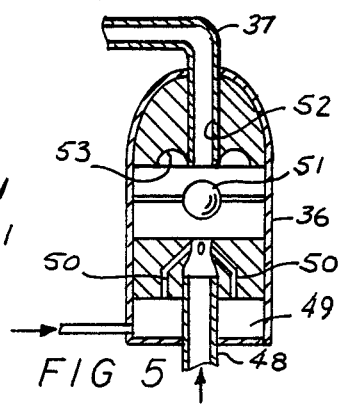
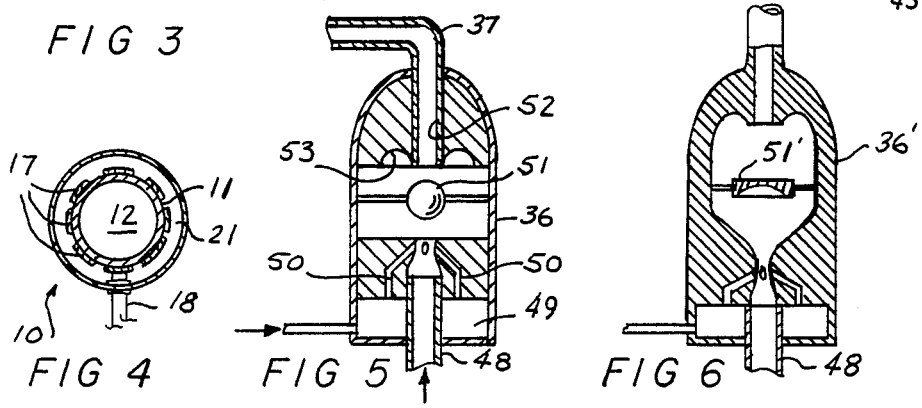
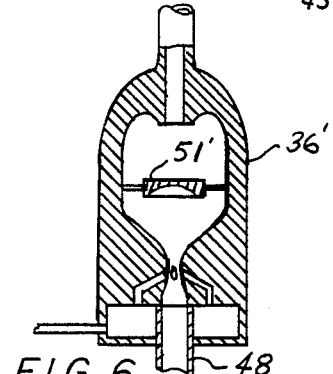
FIG 4    FIG 5    FIG 6

FUEL VAPORIZER

This is a continuation of application Ser. No. 534,410, filed Sept. 21, 1983, now abandoned.

BACKGROUND OF THE INVENTION

1. Field of the Invention

This invention relates generally to fuel vaporizer devices for vaporizing liquid fuel suplied to an internal combustion engine. More particularly, the invention relates to such a device which vaporizes the liquid fuel to a dry, heated vaporous state in a mixture with heated air and supplies the heated mixture to a primary stream of air for introduction into the cylinders of the engine.

2. Prior Art

Numerous attempts have been made in the prior art to more completely vaporize the liquid fuel supplied to internal combustion engines in order to reduce the pollutants discharged into the atmosphere with the exhaust from the engine, or to improve the performance and/or efficiency of the engine. Standard carburetors as commonly used on internal combustion engines use atomizing nozzles or jets which at least partially atomize the liquid fuel supplied to the cylinders of the engine. These droplets rely upon mechanical breakup of the liquid droplets of fuel, and typically introduce the liquid fuel into the throat of a venturi which, due to the sudden drop of pressure in the venturi, causes the droplets to break up into small particles of liquid fuel. The small particles or droplets of liquid fuel are then supplied to the cylinders of the engine for combustion. However, the liquid particles do not burn completely and as a result various pollutants are discharged into the atmosphere with the exhaust from the engine.

Some of the prior art devices have attempted to overcome the problems discussed above by increasing the breakup or vaporization of the liquid fuel. The enhanced or increased vaporization is achieved in a number of ways, including mechanically contacting the particles or droplets of liquid fuel with rotating blades or by causing the fuel to flow through or past screens or swirl chambers and the like. Other devices use heating means to heat the fuel.

Examples of some such prior art devices are described in U.S. Pat. Nos. 1,006,244, 1,997,497, 2,254,634, 2,261,446, 2,733,698, 3,618,577, 4,022,173, 4,106,457, 4,151,821 and 4,330,492. These devices variously mix the air/fuel mixture with hot exhaust gas; use hot exhaust gas or electrical resistance elements to heat the fuel and/or air supplied to the cylinders of the engine; and/or mechanically contact the fuel to cause it to break up into fine particles. However, these devices are either relatively complicated and expensive or they achieve only partial atomization, albeit better then a standard carburetor. Some devices, such as that disclosed in U.S. Pat. No. 1,997,497 to C. N. Pogue, purport to achieve substantially complete atomization of the liquid fuel, whereby a hot, dry gas is supplied to the cylinders of the engine.

SUMMARY OF THE INVENTION

Accordingly, it is a primary object of this invention to provide a fuel vaporizing device which substantially completely vaporizes the liquid fuel before the fuel is supplied to the cylinders of the engine, whereby more complete combustion of the fuel takes place, with consequent increased efficiency and reduced pollutants.

Another object of the invention is to provide a fuel vaporizing device which produces a hot, dry gaseous vapor from liquid fuel, thus enabling substantially complete combustion of the fuel to take place in the cylinders of the engine.

A further object of the invention is to provide a fuel vaporizing device which is simple and economical in construction, and which achieves substantially complete vaporization of liquid fuel, producing a hot, dry gaseous vapor for supply to the cylinders of the engine.

Still another object of the invention is to provide a fuel vaporizer which is a simple retrofit onto existing fuel supply systems for internal combustion engines, and which achieves substantially complete vaporization of liquid fuel supplied thereto, producing a hot, dry gaseous vapor which is readily exploded in the cylinders of the engine.

These and other objects of the invention are accomplished by the use of fuel vaporizing chambers having heat exchangers associated therewith for heating and completely vaporizing droplets of liquid fuel supplied thereto, producing a hot, dry gaseous mixture of fuel and air which is then fed into a primary air supply for introduction into the cylinders of the engine. According to a first form of the invention, the vaporization chamber is heated with hot exhaust gases from the engine, and according to a second form of the invention the vaporization chamber is heated with electric resistance elements. In both forms of the invention, supplemental fuel supply means is provided for introducing fuel during starting of the engine, or under acceleration, etc. The supplemental fuel supply also comprises vaporized fuel, so that efficient operation of the engine even occurs during these operational phases of the engine.

Contrary to expectations, the hot, dry gaseous fuel vapor produced by the vaporizer of the invention does not result in overheating of the engine or burning of the valves when supplied to the cylinders of the engine and combusted. On the other hand, substantial improvement in fuel economy is achieved, and, it is expected, substantial reduction in pollutants will also result due to the substantially complete combustion of the fuel. The invention will thus not only achieve enormous energy savings but will also significantly reduce the amount of pollutants introduced into the atmosphere, while at the same time eliminating the necessity of providing expensive catalytic converters and the like on new vehicles in order to meet emission control standards.

BRIEF DESCRIPTION OF THE DRAWINGS

Referring now to the drawings, wherein like reference characters refer to like parts throughout the several views, and wherein:

FIG. 1 is a schematic top plan view of a first form of the invention;

FIG. 2 is a schematic end view of the invention shown in FIG. 1, with parts broken away for the sake of clarity;

FIG. 3 is a greatly enlarged longitudinal sectional view of the invention shown in FIG. 1;

FIG. 4 is a transverse sectional view taken along line 4—4 in FIG. 3;

FIG. 5 is a further enlarged vertical sectional view of one of the atomizers of FIG. 3;

FIG. 6 is a view similar to FIG. 5 of a modified form of atomizer;

DETAILED DESCRIPTION OF THE PREFERRED EMBODIMENTS

Figure 7:
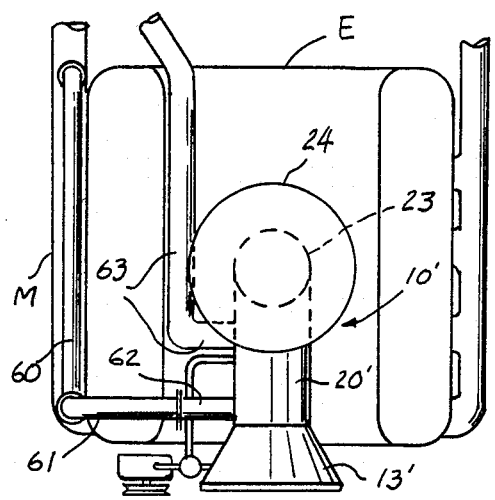
FIG. 7 is a schematic top plan view similar to FIG. 1 of a second form of the invention.

The first form of fuel vaporizer according to the invention is indicated generally at 10 and comprises an elongate tubular housing 11 defining a vaporizer chamber 12. A conical or funnel-shaped inlet 13 is at one end of the chamber 12 for directing atmospheric air into the chamber. For example, the inlet 13 may be advantageously positioned behind the cooling fan (not shown) of the engine "E", whereby a positive pressure or flow of air through the chamber 12 is effected. A suitable filter 14 is preferably positioned over the end of the inlet for filtering out particulate material borne in the air entering the inlet 13.

The outlet end 15 of the housing 11 is preferably externally threaded or provided with other suitable fastening means at 16, and a plurality of elongate electric resistance heating elements 17 are suitably secured on the outer surface of housing 11, in uniformly spaced relationship from the inlet end to the outlet end. The heating elements are connected by suitable wiring 18 with a source 19 of electrical energy, which may be derived from the battery or alternator or other source associated with the engine E.

A tubular housing or shield 20 extends coaxially around the housing 11, defining a dead air space 21 between the tubular housings 11 and 20, concentrating or conserving the heat energy produced by the heating elements 17 to the vaporization chamber 12. The shield 20 is secured at one end 22 to a vertical down draft tube 23, having an air cleaner 24 on its upper end and secured to a base plate 25 at its lower end. The shield 20 is open at its other or forward end 26, and may have suitable sealing means 27 thereon for effecting a seal with the other surface of the conical inlet 13.

The down draft tube 23 has an opening 28 in one side thereof concentric with the shield 20, and a short cylindrical wall 29 projects concentrically within the shield 20. The wall 29 has suitable fastening means complemental with the fastening means on the end of housing 11, and the housing 11 is secured to the wall by cooperative interengagement of the fastening means. Thus, the vaporization chamber may be removed and repaired or replaced by simply threading it out of engagement with the wall 29 and removing it axially from the shield 20. The free end of wall 29 is flared to ease assembly.

A fine mesh screen 30 may be provided in the outlet end of the housing 11 for preventing backfire into the vaporization chamber 12. This screen could be the type once used in miner's lamps, for example.

The down draft tube 23 has a venturi 31 therein at a point below the juncture with vaporization chamber 12, and a flanged connection 32 on its lower end for attachment to the base plate 25. The base plate may comprise the bottom half of a typical carburetor, for example, having butterfly valve or valves 33 therein for controlling flow of air and fuel vapor to the intake manifold "I" (FIG. 2) upon operation of the throttle or accelerator pedal (not shown).

Fuel is supplied to the vaporization chamber 12 via a fuel pump 34, conduit 35, fuel atomizer 36 and nozzle 37 directed into the throat of the inlet 13 to vaporization chamber 12. Liquid fuel is taken from a fuel tank (not shown) by operation of the fuel pump 34, which may be driven by a belt 38 and pulleys associated with the crank or cam or other engine driven device. The pump supplies fuel to a float chamber 39 which directs the liquid fuel to one or both of atomizer devices 36 and 40, depending upon the setting of valve 41. For instance, during starting or acceleration, the valve 41 is operated to supply fuel to atomizer 40 which discharges atomized fuel directly into the venturi 31. To this end, the valve 41 may be controlled by one or both of accelerator pedal position (acceleration) and thermostatically controlled means (engine start-up).

An air pump 42 is suitably driven by pulley and belt means 43, and supplies air under pressure to the atomizers 36 and 40 via conduit 44, valve 45 and conduits 46 and 47. The valve 45 could be controlled with valve 41, if desired.

The pump preferably develops a pressure of from about 10 psi to about 15 psi, and delivers it to an air inlet 48 in the atomizer 36 (and similarly, to atomizer 40). Liquid fuel is supplied from float chamber 39 to a fuel reservoir 49 at the bottom of the atomizer 36, and a plurality of passages 50, preferably four in number, extend upwardly from the reservoir to a point immediately adjacent the outlet from air inlet 48. The upper ends of fuel passages 50 are preferably inclined or angled at about 30° from vertical and are preferably about 0.025 of an inch in diameter. The inside diameter of the air inlet passage 48 is likewise about 0.025 inch. With these parameters, the liquid fuel is atomized into very fine particles ranging in size from about 2 up to about 5 microns, with an average size of about 3 microns. The angled upper ends of the fuel passages 50 may be inclined from about 15° to about 60° from vertical and satisfactory results still obtained.

A ⅛ inch diameter ball 51 is positioned above and in the path of air and fuel from the passages 48 and 50, and the larger particles of fuel are broken up when they strike the ball. Moreover, any such larger particles are directed away from outlet passage 52, which is preferably about ½ inch in diameter. Further fuel redirecting means is provided adjacent outlet passage 52, in the form of an arcuately curved toroidal surface 53. Accordingly, only fine mist particles of fuel are carried through the outlet 52, and the larger particles are detained in the atomizer. It is important to note that the fuel atomized by the atomizers 36 and 40 has a much smaller particle size than any heretofore known fuel atomizer, and vaporization of the fuel may be considered to be effectively accomplished with use of just the atomizers 36 and 40. However, in order to insure that a dry, gaseous vapor is obtained and conditioned such that it will remain in this state until reaching the cylinders, the vaporization chamber 12 is provided for heating the atomized fuel leaving the atomizer 36. The heated air and fuel vapor entering the primary air stream in down draft tube 23, because of its extremely small particle size and heated, dry condition, will remain in this state until it reaches the cylinders. For instance, the fuel vapor should be heated to about 400° to about 450° F., and the heating elements 17 are selected to achieve this temperature level in the vaporized fuel and air mixture.

With the pesent invention, fuel is supplied to the engine in response to demand, and is introduced substantially directly and immediately into the cylinders of the engine after being vaporized, heated and dried. Moveover, the atomizer 40 prevents hesitation during acceleration and avoids hard starting prior to warm up. In this connection, it should be noted that very little warm up time is required since the heating elements very quickly reach their operating temperature. Further, cranking of the engine results in operation of the air pump 42 and supply of positive pressure in the vaporization chamber 12, and reciprocation of the pistons in the cylinders of the engine produces a vacuum or low pressure in the down draft tube 23.

A modified vaporizer 36' is shown in FIG. 6, and differs from that previously described in that a more nearly one-piece construction is used, and the baffle 51' comprises an inverted dish-shaped configuration rather than a ball as in the previously described form of the invention. The operation and size and relationships of passages are the same as before.

Figure 8:
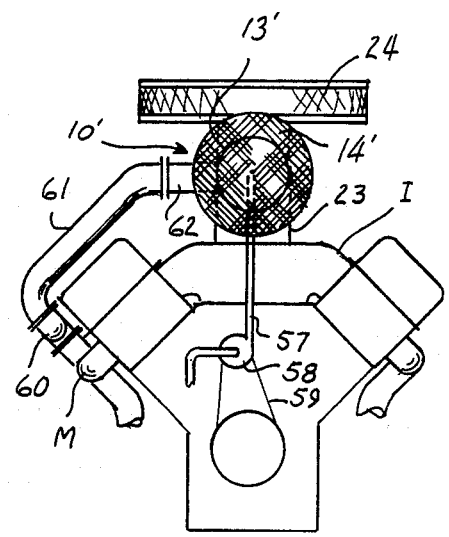
FIG. 8 is a view similar to FIG. 2, showing the second form of the invention.
Figure 9:
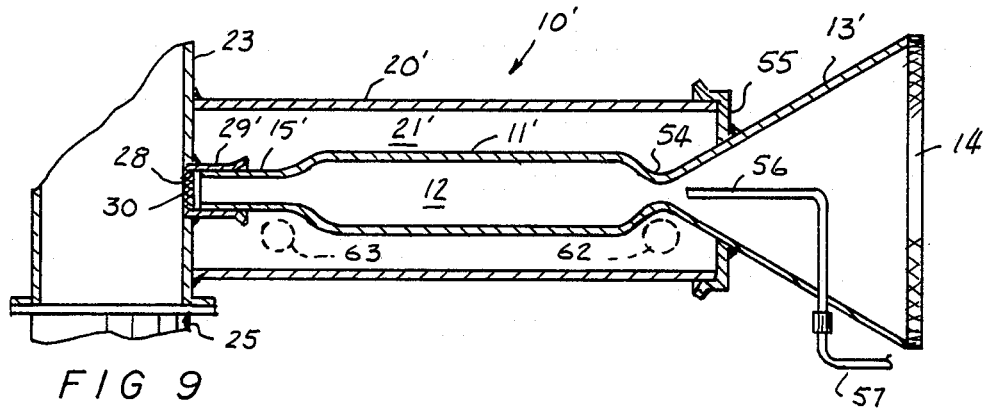
FIG. 9 is a view similar to FIG. 3, showing the second form of the invention.
Figure 10:
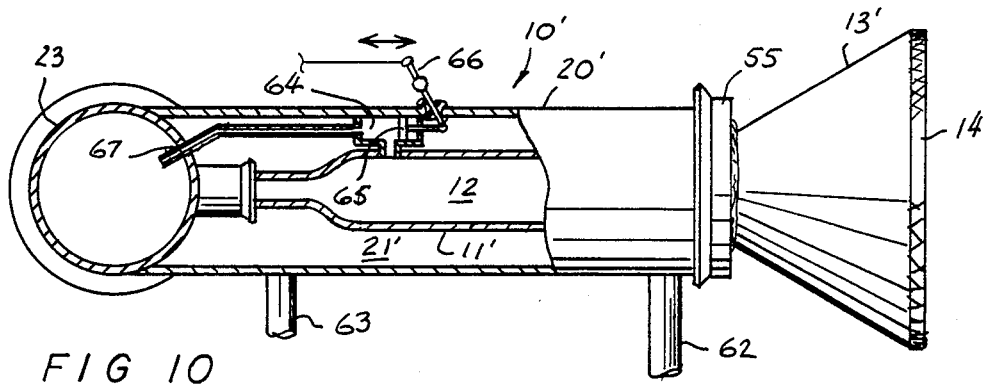
FIG. 10 is a sectional view taken along line 10—10 in FIG. 9.

A modified fuel vaporizer 10' is illustrated in FIGS. 7 through 10, and comprises a tubular housing 11' defining a vaporization chamber 12 therein. A venturi 54 is formed by a necked-down portion at the inlet end of the housing 11', to which air is supplied by conical inlet 13'. The air entering inlet 13' is filtered by filter 14. The housing 11' has a reduced diameter outlet end 15', which is received in a short tubular wall 29' projecting from one side of the down draft tube 23, and a fine mesh anti-backfire screen 30 is positioned in the outlet end 15'.

A cap 55 is secured to the outer surface of inlet 13' and is adapted to be received over one end 26 of tubular housing or shield 20' disposed in coaxial relationship around housing 11'. The shield 20' is secured at its other end to the outside of down draft tube 23 in concentric relationship to wall 29'. The cap may have suitable fastening means associated therewith, such as threads, whereby the housing 11' may be releasably secured to the shield 20'. Alternatively, suitable fastening means may be provided between the end 15' of housing 11' and the wall 29'.

A fuel inlet nozzle 56 is disposed in the throat of venturi 54 for discharging a spray of fuel into the throat of the venturi to atomize the fuel. The nozzle 56 receives fuel from conduit 57 connected with fuel pump 58, driven by a belt or the like 59 associated with a driven part of the engine E. The pump, in turn, receives fuel from the tank (not shown).

In this form of the invention, the atomized fuel is heated, dried and vaporized by heat extracted from the hot exhaust gases from the engine. These hot exhaust gases are taken from the exhaust manifold M of the engine via a conduit 60. A removable section of flanged pipe or conduit 61 is connected between the conduit 60 and an inlet nipple 62 connected with the housing or shield 20' to supply hot exhaust gas to the annular space 21' between the housing 11' and shield 20'. The hot exhaust gases are exhausted from the annular chamber 21' via a conduit 63 extending rearwardly from the engine and suitably connected with the exhaust pipe. The hot exhaust gases circulating around the housing 11' thoroughly dry and vaporize the liquid fuel sprayed into the vaporization chamber 12 by the nozzle 56, and substantially complete combustion of the fuel is thereby accomplished when the fuel is combusted in the cylinders of the engine.

To prevent hesitation during acceleration and to assist during starting of the engine, an accumulator chamber 64 is disposed inside the shield 20' in communication with the inside of vaporization chamber 12 for receiving and accumulating an amount of vaporized fuel and heated air. A piston or the like 65 is disposed inside the accumulator chamber and is connected via linkage 66 with suitable operating means, which may include the accelerator pedal and/or thermostatically controlled means (not shown), to operate the piston to force an amount of vaporized fuel into the down draft tube 23 via a nozzle 67 when operation of the engine requires it.

Both forms of the invention described herein achieve thorough vaporization of liquid fuel supplied thereto, and subsequent combustion of the fuel in the cylinders of the engine is therefore substantially complete, with improved efficiency and reduced discharge of pollutants into the atmosphere. Moreover, the invention is exceptionally simple and economical in construction, and may be readily retrofitted to existing engines without requiring extensive modifications. Further, it is not believed that any more complicated control of the temperature in the vaporization chamber is necessary, although thermostatically operated controls and the like may be used if desired, to regulate the maximum temperature obtained in the vaporization chamber.

While the fuel vaporizer has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A fuel vaporizer for an internal combustion engine, comprising:
   carburetor means for regulating the supply of air and fuel mixture to the engine, said carburetor means including a tubular housing for flow of a primary air stream to the engine;
   fuel atomizing means for atomizing liquid fuel supplied thereto;
   fuel vaporizing means connected between the fuel atomizing means and the carburetor means to vaporize the atomized fuel and to supply air and vaporized fuel to the primary air stream, said fuel vaporizer means comprising a vaporizer chamber having an inlet end for receiving air and atomized fuel and an outlet end for delivery of air and vaporized fuel to the carburetor means, and heating means operatively associated with the vaporizer chamber to heat the air and atomized fuel flowing therethrough to dry and vaporize the atomized fuel; and
   supplemental vaporized fuel supply means connected with the carburetor means to supply vaporized fuel directly to the carburetor means during start up and acceleration of the engine.

2. A fuel vaporizer for an internal combustion engine as claimed in claim 1, wherein:
   fuel atomizing means are associated with both the supplemental vaporized fuel supply means and the fuel vaporizing means, said fuel atomizing means comprising a fine mist atomizer having air and fuel passages constructed and arranged for producing fuel particles ranging in size from about 2 microns up to about 5 microns.

3. A fuel vaporizer for an internal combustion engine as claimed in claim 2, wherein:
   the fine mist atomizer for the supplemental vaporized fuel supply means and the fuel atomizing means each comprises a housing having an outlet and an air inlet passage, said air inlet passage having an outlet in the housing, a fuel reservoir in the housing, and fuel passages extending from the fuel reservoir to adjacent the air passage outlet;

said fuel passages and air passage terminating in a venturi so that flow of air from the air passage through the venturi draws fuel from the fuel passages; and air supply means connected to the air passage to supply air under pressure thereto, the pressure of said air and the dimensions of said passages being such that said fuel is atomized to particles having an average size of about 3 microns.

4. A fuel vaporizer for an internal combustion engine as claimed in claim 3, wherein:

the heating means comprises electrical resistance elements disposed in surrounding relation to the vaporizer chamber.

5. A fuel vaporizer for an internal combustion engine as claimed in claim 4, wherein:

the vaporizer chamber is disposed coaxially within a tubular shield for conserving and concentrating the heat produced by the heating elements.

6. A fuel vaporizer for an internal combustion engine as claimed in claim 5, wherein:

the vaporizer chamber is readily releasably connected to the carburetor means to facilitate repair or replacement of the vaporizer chamber.

7. A fuel vaporizer for an internal combustion engine as claimed in claim 1, wherein:

the supplemental vaporized fuel supply means comprises an accumulating chamber in communication with the vaporizer chamber to receive and store air and vaporized fuel for use during engine start-up and acceleration.

8. A fuel vaporizer for an internal combustion engine as claimed in claim 7, wherein:

the vaporizer chamber comprises an elongate tubular housing disposed coaxially within a tubular shield, defining an annular space therebetween.

9. A fuel vaporizer for an internal combustion engine as claimed in claim 8, wherein:

the heating means comprises hot exhaust gases from the engine, said exhaust gases being supplied by an inlet conduit to one end of the annular chamber and exhausted by an outlet conduit from the other end of the annular chamber.

10. A fuel vaporizer for an internal combustion engine as claimed in claim 9, wherein:

the inlet end of the vaporizer chamber is coaxially arranged relative to the vaporizer chamber and is conically shaped to direct a maximum amount of air to the vaporizer chamber;

a venturi is between the conical inlet and vaporizer chamber; and fuel supply nozzle means is positioned for discharging a spray of fuel into the throat of the venturi to atomize fuel.

11. A fuel vaporizer for an internal combustion engine as claimed in claim 9, wherein:

the accumulator chamber is disposed in the annular chamber between the tubular housing and tubular shield; and piston means is in the accumulator chamber for forcing the accumulated air and vaporized fuel therefrom into the carburetor means.

* * * * *